US005289575A

United States Patent [19]

Godfrey

[11] Patent Number: 5,289,575

[45] Date of Patent: Feb. 22, 1994

[54] GRAPHICS COPROCESSOR BOARD WITH HARDWARE SCROLLING WINDOW

[75] Inventor: Tim G. Godfrey, Overland Park, Kans.

[73] Assignee: Nellcor Incorporated, Pleasanton, Calif.

[21] Appl. No.: 796,526

[22] Filed: Nov. 22, 1991

[51] Int. Cl.$^5$ .............................................. G06F 15/20

[52] U.S. Cl. .................................... 395/162; 395/138; 395/166; 345/200

[58] Field of Search ............... 395/162, 164, 166, 138, 395/148; 340/750, 724, 798-799

[56] References Cited

U.S. PATENT DOCUMENTS

| | | | |
|---|---|---|---|
| 4,727,423 | 7/1988 | Kaneko et al. | 395/164 |
| 4,755,937 | 7/1988 | Glier | 364/200 |
| 4,985,871 | 1/1991 | Catlin | 365/230.06 |
| 4,992,961 | 2/1991 | Petersen | 340/799 |

*Primary Examiner*—Dale M. Shaw
*Assistant Examiner*—Kee M. Tung
*Attorney, Agent, or Firm*—Townsend and Townsend, Khourie and Crew

[57] ABSTRACT

A graphics coprocessor adapter with hardware support for horizontal scrolling is disclosed. A graphics processor provides both a row address with a RAS signal and a column address with a CAS signal to two banks of video RAMs. Both banks are provided with the same scrolling column address signal. Translating logic intercepts the column address signal for the static plane RAM bank and translates it into a fixed value. Thus, a single column address signal can control both the scrolling and static planes.

6 Claims, 7 Drawing Sheets

| | | LAD PIN NUMBERS | | | | | | | | | | | | | | | |
|---|---|---|---|---|---|---|---|---|---|---|---|---|---|---|---|---|---|
| | | 15 | 14 | 13 | 12 | 11 | 10 | 9 | 8 | 7 | 6 | 5 | 4 | 3 | 2 | 1 | 0 |
| TMS34010 LOGICAL ADDRESS BITS* | AT FALL OF $\overline{RAS}$ | $\overline{RF}$ | 26 | 25 | 24 | 23 | 22 | 21 | 20 | 19 | 18 | 17 | 16 | 15 | 14 | 13 | 12 |
| | AT FALL OF $\overline{CAS}$ | IAQ | $\overline{TR}$ | 29 | 28 | 27 | 14 | 13 | 12 | 11 | 10 | 9 | 8 | 7 | 6 | 5 | 4 |

* BUS STATUS SIGNALS:
$\overline{RF}$ – DRAM REFRESH CYCLE
IAQ – INSTRUCTION ACQUISITION CYCLE
$\overline{TR}$ – REGISTER-TRANSFER CYCLE

*FIG. 6*

GRAPHICS COPROCESSOR BOARD WITH HARDWARE SCROLLING WINDOW

BACKGROUND

The present invention relates to graphics processors which support scrolling windows.

Graphics processor boards control the display on a monitor using special video RAMs. These chips are similar to conventional dynamic RAMs, but they have an internal shift register that can be loaded from an entire row of bits in the RAM array in a single cycle. The shift register data can then be serially clocked out on a separate pin, while the memory portion of the chip continues to perform random read and write cycles. The selection of a row to be transferred to the video RAM shift register is done using a RAS signal from a graphics processor. One graphics processor specially designed for working with video RAMs is the Texas Instruments' 34010. The 34010 outputs a signal called TRQE-L which indicates the start of shift register transfer cycle. Data is transferred out of the shift register serially starting from a column address indicated during a CAS signal from the processor. To accomplish scrolling, the column address signal is simply changed to indicate the appropriate starting position for the amount of scrolling desired.

The video memory is organized as a scrolling plane and a static plane. The static plane is normally visible as the "foreground". Windows can be written in the static plane to make the scrolling plane visible. A typical configuration for accomplishing this is shown in FIG. 1.

FIG. 1 shows a microprocessor 10 with system RAM 12. The processor provides control signals to video RAM 14. Processor 10 will provide the TRQE signal to indicate a shift register transfer cycle, followed by a row address and RAS signal specifying which row to transfer. Then the column address and CAS signal indicate from where in the shift register data is to start. The outputs of the video RAM 14 are provided to a color palette look-up table 18. Windows can be generated in software, with the combined window and background provided by the processor. Overlays are generated by writing zeros into the overlay location in the VRAM 14. Look-up table 18 will then compare the pixel bits and substitute the overlay data when there is a zero in the VRAM data.

One such look-up table is the Brooktree BT478, which is shown in block diagram form in FIG. 2. The look-up table contains a color palette RAM 20 which stores color values for data coming in. The data comes in through a latch 22 which provides both the normal video data on the upper bus (PO-P7) and the overlay data on the lower bus (OL0-OL3). The video data is passed through a mask register 24 to set any unused input bits to zero. Outputs are provided in analog form through digital-to-analog converters. The color palette RAM will compare the normal video and overlay data and substitute the overlay data output when zeros are detected for normal video data pixels.

SUMMARY OF THE INVENTION

The present invention provides a graphics coprocessor adapter with hardware support for horizontal scrolling. A graphics processor provides both a row address with a RAS signal and a column address with a CAS signal to two banks of video RAMs. Both banks are provided with the same scrolling column address signal. Translating logic intercepts the column address signal for the static plane RAM bank and translates it into a fixed value. Thus, a single column address signal can control both the scrolling and static planes.

The present invention also provides multiplexing logic for selecting between the static and scrolling RAM data. The selection is controlled by a separate overlay RAM. This allows a higher number of bits per pixel to be used without requiring an expensive high bit capacity look-up table chip.

The multiplexing logic also provides the capability to scroll on a pixel-by-pixel basis. A typical video RAM will output 32 bits at a time, typically covering four pixels. To scroll in increments of less than four pixels, special timing logic is provided by the present invention to shift out the excess pixels during the horizontal blanking interval.

For a fuller understanding of the nature and advantages of the invention, reference should be made to the ensuing detailed description taken in conjunction with the accompanying drawings.

BRIEF DESCRIPTION OF THE DRAWINGS

FIG. 6 is a table of the address output during RAS and CAS for the 34010; and

DETAILED DESCRIPTION OF THE PREFERRED EMBODIMENTS

Figure 1:
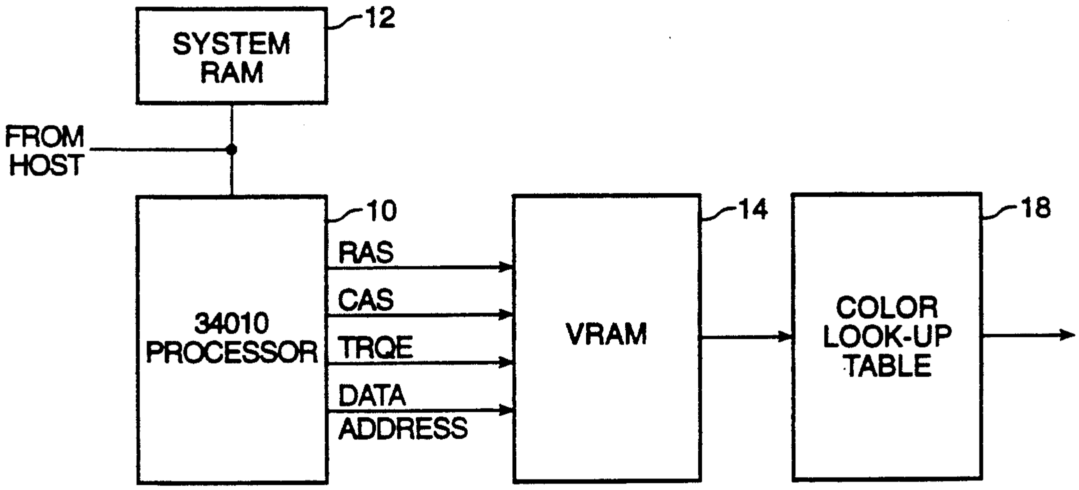
FIG. 1 PRIOR ART
FIG. 1 is a block diagram of a prior art graphics processor adapter.
Figure 2:
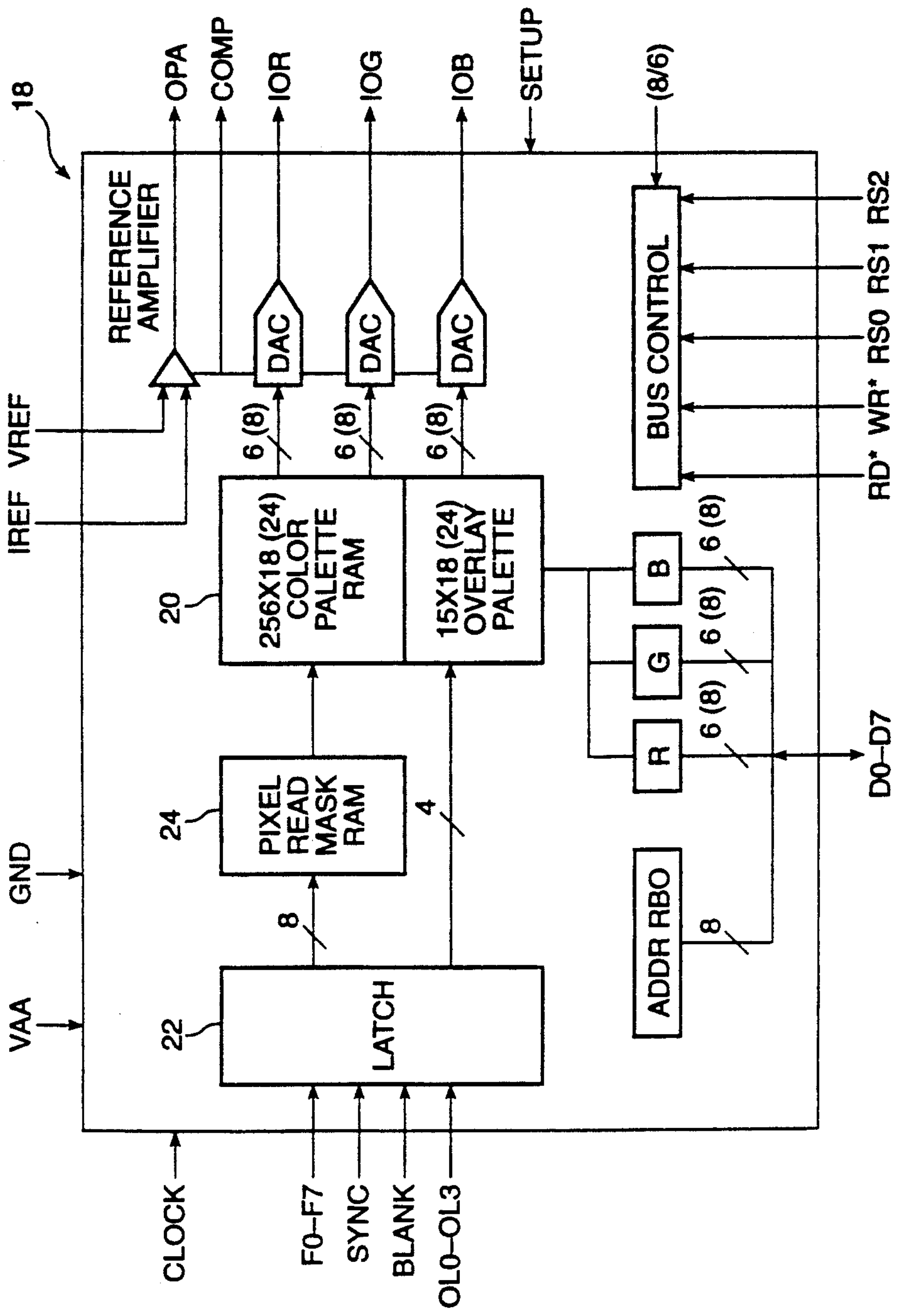
FIG. 2 PRIOR ART
FIG. 2 is a block diagram of the look-up table of FIG. 1.
Figure 3:
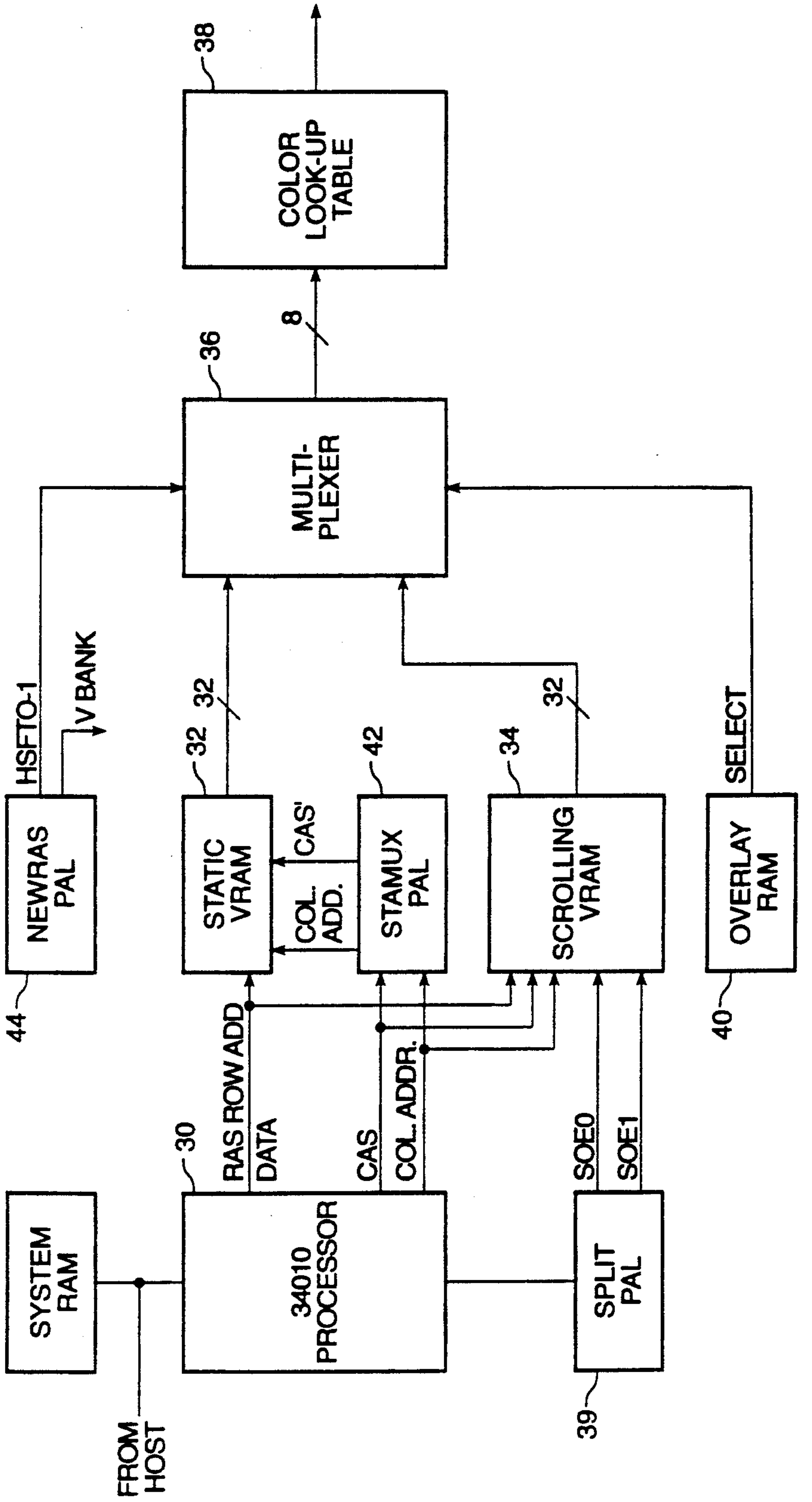
FIG. 3 is a block diagram of a graphics adapter board according to the present invention.

FIG. 3 is a block diagram of a preferred embodiment of a graphics processor adapter according to the present invention. The adapter is controlled by a processor 30, normally a TI TMS34010. Two banks of video RAM are provided, a static VRAM bank 32 and a scrolling VRAM bank 34. The data outputs of both these VRAM banks are outputted through multiplexing circuitry 36 to a color look-up table 38. Whether the static data or scrolling data is used is determined by an overlay RAM 40 which controls a select input of multiplexer 36.

A logic circuit 42, implemented with a programmable logic array, intercepts the column address signal from processor 30. Whenever a CAS signal is received while TRQE is low (indicating a shift register transfer cycle), a substitute column address signal containing the static plane horizontal offset (normally zero) is provided to static VRAM bank 32 (by not specifying zero we include implementations using foreground and background scrolling). At the same time, the unchanged CAS signal and column address is provided to scrolling VRAM bank 34. This prevents the static plane from scrolling when the 34010 is scrolling the scrolling plane. This provides the hardware support for simultaneous scrolling and non-scrolling regions with a single graphics processor.

Both VRAM banks output data in groups of 32 bits, which provides four pixels per shift register clock. Thus 4 pixels at a time are provided to pixel multiplexers 36.

The pixel multiplexers 36 take the video RAMs serial data outputs and multiplex them into digital video at the pixel clock rate. They also perform horizontal scrolling within the groups of four pixels. They are scrolled by shifting the multiplexing timing with respect to the edges of the scan line blanking interval as discussed below.

A split PAL logic block 39 allows two independent scrolling regions to be horizontally adjacent. It controls which bank of video RAM in scrolling VRAM 34 is enabled at any time, using enable signals S0E0, S0E1. The function is discussed below with respect to FIGS. 7A and 7B.

The pixel multiplexers can be implemented with XC2064 Logic Cell Arrays, (LCAs) from Xilinx. These programmable logic devices are based on static RAM cells, so they have to be configured each time they are powered up. The advantage of soft configuration is that the same parts may be re-configured for different functions through software. This feature is used to support the multiple memory configurations. Each configuration has a different configuration data file for the LCAs.

Figure 4:
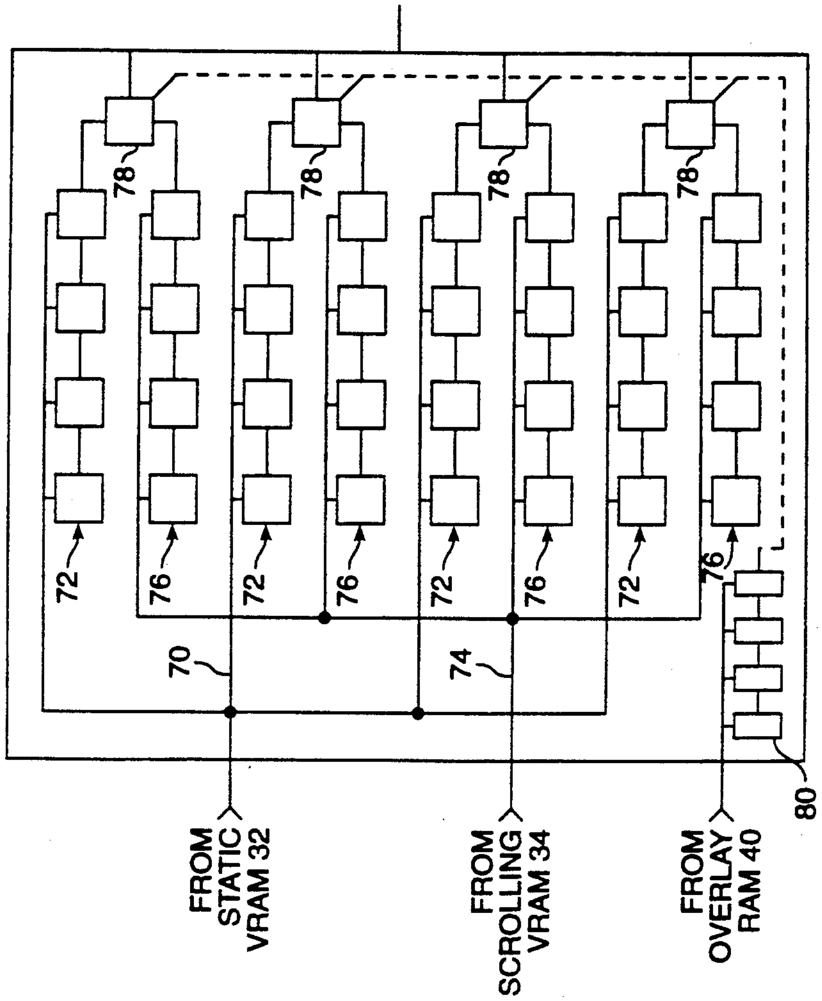
FIG. 4 is a block diagram of the multiplexing circuitry of FIG. 3.

Internally, the LCAs are organized as an 8×8 array of Configurable Logic Blocks (CLB), with an array of interconnect paths between the logic blocks. Each block, or CLB, contains a 4 input multiplexer and a D flip-flop. The circuit design is completely synchronous, so all CLBs are clocked with the pixel clock. FIG. 4 is a block diagram of the logical operation of the pixel multiplexers.

FIG. 4 shows the input from static RAM 32 on a bus 70 going to 4 shift registers 72. An input from scrolling VRAM 34 on bus 74 is applied to shift register 76. All the elements of the shift registers are loaded in parallel with the bits for 4 pixels. They are then shifted one element at a time through multiplexers 78. The selection between the static and scrolling plane is controlled by bits from an overlay RAM provided into a shift register 80, which is shifted as well to control the multiplexer output for each pixel position. FIG. 4 shows 4 output bits. For an 8 bit configuration, two circuits, like those in FIG. 4, are used. When scrolling with more than 4 pixel resolution is desired, the extra pixels are simply shifted out through the multiplexers during the blanking interval, thus advancing the desired pixel to the multiplexer at the time a line starts, as described in more detail below.

Figure 5:
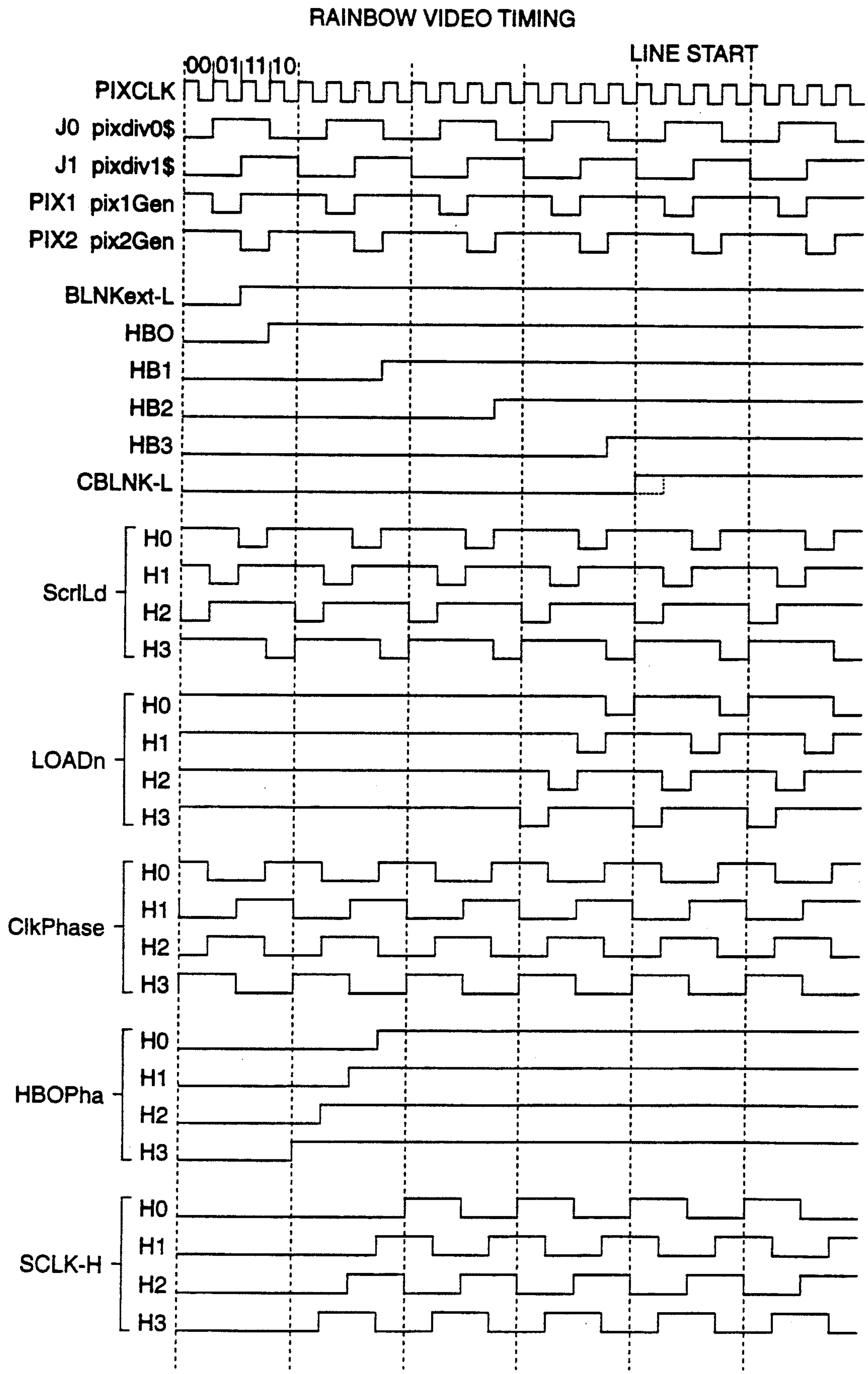
FIG. 5 is a diagram of the timing signals used to provide pixel-by-pixel scrolling.

The timing diagram of FIG. 5 shows the signals that are generated and/or used inside the Pixel Multiplexer LCAs. The timing diagram corresponds to the beginning of a scan line. During the scan line, data continues to flow through the pipeline as it was set up at the line start. Signals that are grouped in fours labeled H0 through H3 correspond to the same signals, showing the differences caused by the four states of the fine horizontal scroll offset input HSFT0-1, corresponding to the blocks of four pixels that are being multiplexed.

The PIXCLK is the master clock for the entire LCA. Each CLB is clocked from PIXCLK, which uses the low skew master clock distribution connection on the LCA. PIXCLK drives a 2-bit Johnson counter to produce the clock phases J0 and J1 in quadrature. The PIX1 and PIX2 strobes are decoded off the previous state, since each signal is synchronous. The data flow through the LCA is implemented as a pipeline, with four PIXCLKs per pipeline state. The vertical dashed lines indicate pipeline states. The PIX1 and PIX2 strobes are generated early, to allow one or two subsequent PIXCLK delays before synchronizing with the pipeline. The phase of the scrolling pipeline is shifted by 0 to 3 PIXCLK periods to implement fine horizontal scrolling.

The blanking signal drives the transition from blanking to active video and back. BLNKext-L is the signal on the input pin of the LCA from the graphic processor. After being clocked through one CLB, it is synchronized with the pipeline, one state ahead. The blanking signal is delayed in parallel with the data pipeline for three pipeline stages. The intermediate signals are called HB1, HB2, and HB3. The final output is delayed a single pixel clock, to match up with the data pipeline. In configurations using the overlay plane, the output blanking signal, CBLNK-L is delayed an extra pixel clock to compensate for the extra clock of delay the data goes through in the static/scrolling switch stage.

The data pipeline can be described in the following sequence. First, the data is clocked out of the video RAMs with SCLK. Next, the data is latched in the input registers of the LCA. Next, the data is loaded into the internal LCA shift registers. Then the data is shifted out serially as four pixels.

The operation of the scrolling data pipeline is controlled by the ScrlLd and ClkPhase signals, which vary in phase according to the HSFT inputs. The static data pipeline operates identically, except it always uses the H0 timing phase. The ScrlLd and CLkPhase signals are derived from the HSFT signals, and the J0 and J1 clocks. The external video RAM shift clocks SCRLCLK and STATCLK are connected from LCA outputs to the video RAM array.

The generation of the video RAM shift clock, SCLK, is gated by the internal signal HB0Pha, which is in turn generated from the OR of HB0 and HB3. At the start of a line, HB0 goes active first, three pipeline states before CBLNK goes active. HB0 active at the same time as the SCRLD strobe causes HB0Pha to go active. HB0Pha active gates ClkPhase to produce SCLK, one pixel clock later. The one pixel clock delay is why ClkPhase is generated a state ahead of the desired SCLK phase. Once the SCLK has started, the data will be loaded into the shift registers two pipeline states later.

When they are active, the LOADn signals cause the internal pixel shift register to parallel load four bits instead of shifting. Internally to the LCA, there are several identical LOAD signals due to timing and fanout requirements, hence the "n". The ScrlLd signals are generated a state ahead of the required LOADn timing, which is again one state ahead of the actual shift register loading. When blanking signal HB2 goes active, the LOADn signal is generated from the ScrlLd signal. The LOADn signal causes the shift registers to load the first 4 pixels at the start of the "Data In Shift Registers" phase of the pipeline, which is the same time as when CBLNK-L goes inactive at the start of active video. The next three pixel clocks shift out the remaining pixels of the group, then the process is repeated with another load.

The data pipeline continues to operate in this pattern until the end of the line, which is indicated by the falling edge of BLNKext-L. When HB2 goes low, HBOPha goes inactive, disabling the shift clock, SCLK. After HB3 goes inactive, the LOADn signals are disabled after the last group of four pixels have been loaded into the shift registers. After the last 3 pixels have shifted out, the register fills with zeros, and the CBLNK-L output goes active.

To scroll one pixel to the left, the HSFT signals are set to the 01 value during the blanking interval before the line starts. (This happens automatically during the 34010's video transfer cycle.) As the SCLK and LOADn signals are enabled, they are generated from the H1 phases of the ClkPhase and ScrlLd signals respectively. These phases are advanced in time by one pixel clock, causing the first shift register load to occur one clock before blanking goes inactive. Thus, the first pixel is output while blanking is still active and is not seen. All subsequent pixels are displayed one clock earlier. This results in the entire scan line being shifted left by one pixel. Shifts of 2 and 3 pixels correspond to the H2 and H3 phases. A shift of 4 is done through the shift register offset in the video RAMs.

When a non-zero scrolling offset is used, an "extra" group of four pixels are required at the end of the line, to make up for the pixels that were "lost" at the start. This is provided by delaying the end of SCLK and LOADn by gating them with the delayed versions of blanking. If the visible screen width is 1024 pixels, these "extra" pixels are actually wrapped around from the start of the same scan line. If this is a problem the 34010 can be programmed for a visible line length of 1020 pixels, or a small border can be drawn in the static plane covering the wrapped pixels. The static plane doesn't scroll, so it won't have any wrapping.

In the LCA configurations supporting the overlay plane, there is an additional four bit shift register to serialize the overlay bits into a pixel rate signal. This signal is used to switch a 2 to 1 multiplexer at the outputs of the pixel shift registers between the static plane data and the scrolling plane data.

The horizontal shift timing is generated by the programmable logic array 44 of FIG. 3. Logic array 44 generates the fine horizontal shift signals, HSFTO-1 from the high order bits of the column address, which are not used by the video RAMs. This logic array 44 also does the address decoding and generates a V BANK signal to select one of two banks in the scrolling plane (lines 0–511 or 512–1023). FIG. 6 illustrates the address multiplexing of the 34010 processor. 32 bits are multiplexed on the output during the RAS and CAS signals over 16 LAD pins. As can been seen, logical address bits 12–14 are output twice.

For one megabyte video or system RAM configuration of 256K×4, the present invention must compensate for the 8 bit span between RAS and CAS. A logic array 42 shifts the address bits to provide 9 unique bits during each of RAS and CAS. The shifting could be done during either RAS or CAS. For example, during CAS, 9 address bits are provided from pin 0–8 corresponding to logical address bits 4–11. During the RAS cycle, these same pins generate logical addresses 12–20. As can be seen, there is an overlap of logical address bit 12. Accordingly, during a RAS cycle, logic 42 will ignore logical address 12 (pin zero) and drive the 9 bits from pins 1–9.

Two different organizations of 1 meg video RAMs are used. For the scrolling plane, the VRAMs are organized as 128K×8. Internally, these VRAMs have 8 planes of 512 rows and 256 columns. The 256 columns correspond to 256 bit shift registers. Since the contents of 4 shift registers are multiplexed to form one line, and the maximum supported number of pixels per line is 1024, it is important to use VRAMs with shift register lengths of 256. When scrolling, the lines wrap around from pixel 1023 to pixel 0, automatically, since the data is arranged that way in the shift registers.

1 meg VRAMs organized as 256K×4 are more commonly available. They are internally organized as 4 planes of 512 rows and 512 columns, with 512 bit shift registers. When used with the 4 to 1 multiplexing scheme of the present invention, they result in a physical line length of 2048 pixels, or 2 lines. The graphics processor provides a bit causing the shift register start point to shift by half the register, or 256 bits, on odd lines. Thus, scan lines 0 and 1 are generated from the first row of the VRAM, but line 1 starts out halfway through the register. The STAMUX PAL 42 is programmed to allow that one bit to pass through to the static plane VRAMs. Since the static plane does not scroll, the actual line length of 2048 pixels is not a problem.

The same 128K×8 VRAMz could be used for both the static and scrolling plane. The 256K×4 type was chosen for the static plane for two reasons. First, the 256K×4 parts are less expensive, so they are used where they can be used. Secondly, the standard DRAMs used for system RAM are only available in 256K×4 organization. Since the system RAM chips do not respond to TRQE transfer cycles, the same address multiplexer PAL (STAMUX) 42 can be used for both the static plane and the system RAM, saving a chip.

One aspect of the present invention allows two different, independently scrolling areas to be placed side-by-side on a screen. In the normal mode of operation, shown in FIG. 7A, two banks of video RAM, 50 and 52, are controlled by an enable signal on line 54 and an inverse enable signal on line 56. The outputs are provided to a display 58. The enable signal selects the first bank 50 for the first 512 lines of the display 58. Then, the enable signals switch so that bank 52 will be selected during the last 512 lines. This existing enable signal is used to provide a dual (split) horizontal scrolling functions as shown in FIG. 7B.

Without any special hardware, it is possible to have independently scrolling regions vertically adjacent. This is done using the line interrupt. When a given line is scanned, the graphics processor interrupts itself and executes a software routine, which reprograms the scrolling offset registers with the scrolling parameters for the next scrolling region. This technique cannot be used to provide horizontally adjacent separate scrolling regions, since the shift registers are loaded once at the start of the line, and then shift out without any opportunity for processor intervention. Hence, the bank switching method was invented to allow a different shift register to provide data after the split point.

Figure 7A:
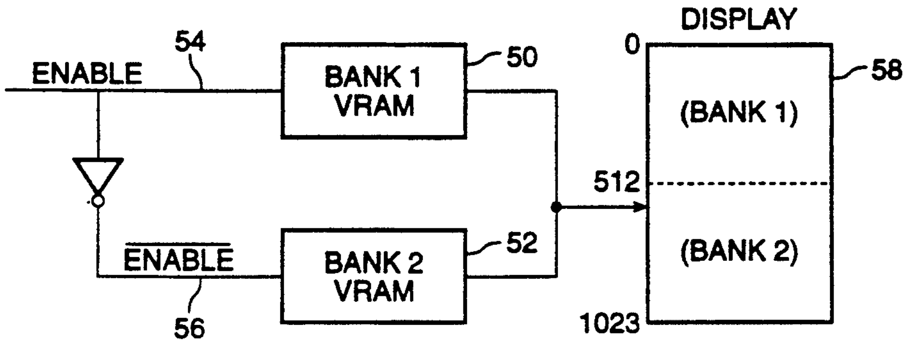
FIGS. 7A and 7B are diagrams illustrating the split window mode.
Figure 7B:
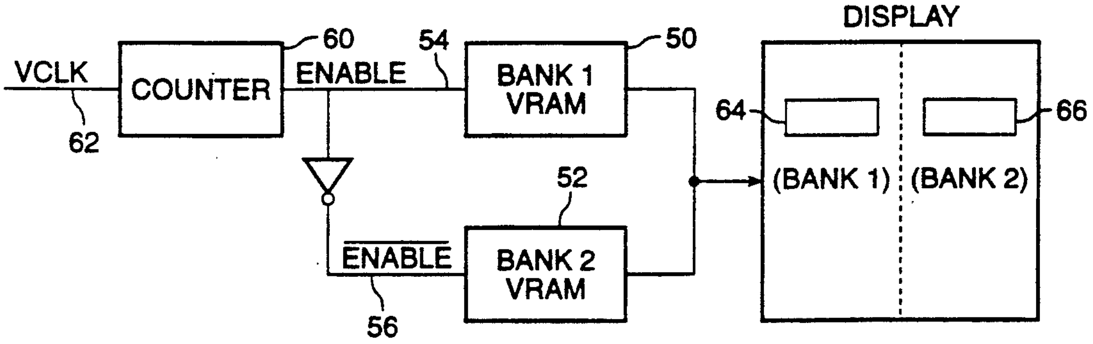

FIG. 7B shows the same arrangement as FIG. 7A with the addition of a counter 60. Counter 60 provides the enable signal from a V clock signal 62. The counter counts the number of pixels provided and switches the enable signal every time a programmable point in the line is reached. When the end of the display line is reached, the enable signal switches back. This results in the two banks of video RAMs controlling the two halves of the display side-by-side, rather than top and bottom. Each bank can then have its corresponding window 64 and 66, respectively. This is a simple way of providing the capability for two horizontal scrolling windows, although it does result in half of the RAM in each bank being unused. A separate register provides the scrolling position for the right window.

As will be understood by those familiar with the art, the present invention may be embodied in other specific forms without departing from the spirit or essential characteristics thereof. Accordingly, the disclosure of the preferred embodiment of the invention is intended to be illustrative, but not limiting, of the scope of the invention which is set forth in the following claims.

What is claimed is:

1. A graphics processor system comprising:

a graphics processor which produces a row address strobe (RAS) signal, a column address strobe (CAS) signal and their corresponding addresses, including a scrolled column address;

a first bank of video random access memories (RAMs) coupled to said graphics processor to receive said RAS, CAS and corresponding address signals;

a second bank of video RAMs coupled to said graphics processor to receive said RAS signal; and substituting means, coupled between said graphics processor and said second bank of video RAMs, for substituting for said scrolled column address signal from said graphics processor a static plane column address signal, and providing said static plane column address signal to said second bank of video RAMs;

whereby a single column address signal from said graphics processor controls both scrolling and static planes.

2. The system of claim 1 further comprising:

a multiplexer having inputs coupled to serial data outputs of said first and second banks of video RAMs;

an overlay RAM having an output coupled to a select input of said multiplexer for selecting between scrolling data in said first bank of video RAMs and static data in said second bank of video RAMs; and a color look up table coupled to an output of said multiplexer.

3. The system of claim 2 wherein said first and second banks of video RAMs output parallel data corresponding to a plurality of pixels at a time, and further comprising:

a shift register coupled between said multiplexer and said color look-up table for converting said parallel data into serial data; and clocking means, coupled to said shift register, for varying the timing of pixels output with respect to a horizontal blanking interval, to allow pixel to pixel scrolling by varying a position within said plurality of pixels where a line will start.

4. The system of claim 1 further comprising counter means for switching an enable signal provided to said first and second banks of video RAMs midway through a scan line to provide a vertical boundary on a display between areas controlled by said first and second banks of video RAMs.

5. The system of claim 1 wherein said means for substituting comprises means for replacing said scrolled column address with a predetermined starting column address and further comprising a register for storing said predetermined starting column address.

6. A graphics processor system comprising:

a graphics processor which produces a row address strobe (RAS) signal, a column address strobe (CAS) signal and their corresponding addresses, including a scrolled column address;

a first bank of video random access memories (RAMs) coupled to said graphics processor to receive said RAS, CAS and corresponding address signals;

a second bank of video RAMs coupled to said graphics processor to receive said RAS signal;

substituting means, coupled between said graphics processor and said second bank of video RAMs, for substituting for said scrolled column address signal from said graphics processor a static plane column address signal, and providing said static plane column address signal to said second bank of video RAMs;

a multiplexer having inputs coupled to serial data outputs of said first and second banks of video RAMs;

an overlay RAM having an output coupled to a select input of said multiplexer for selecting between scrolling data in said first bank of RAMs and static data in said second bank of RAMs; and a color look up table coupled to an output of said multiplexer;

whereby a single column address signal from said graphics processor controls both scrolling and static planes.

* * * * *